(12) United States Patent
Wall

(10) Patent No.: US 7,360,079 B2
(45) Date of Patent: Apr. 15, 2008

(54) SYSTEM AND METHOD FOR PROCESSING DIGITAL DOCUMENTS UTILIZING SECURE COMMUNICATIONS OVER A NETWORK

(75) Inventor: David A. E. Wall, Kirkland, WA (US)

(73) Assignee: Yozons, Inc., Kirkland, WA (US)

(*) Notice: Subject to any disclaimer, the term of this patent is extended or adjusted under 35 U.S.C. 154(b) by 668 days.

(21) Appl. No.: 10/039,031

(22) Filed: Jan. 4, 2002

(65) Prior Publication Data

US 2002/0091927 A1  Jul. 11, 2002

Related U.S. Application Data

(60) Provisional application No. 60/259,941, filed on Jan. 5, 2001.

(51) Int. Cl.
*H04L 29/00* (2006.01)

(52) U.S. Cl. .............. 713/155; 713/165; 713/167; 713/176; 705/67; 380/30

(58) Field of Classification Search ................ 713/176, 713/165, 167, 155; 705/67; 380/30
See application file for complete search history.

(56) References Cited

U.S. PATENT DOCUMENTS

| | | | |
|---|---|---|---|
| 5,862,223 A | 1/1999 | Walker et al. | |
| 5,987,140 A | 11/1999 | Rowney et al. | |
| 6,178,409 B1 | 1/2001 | Weber et al. | |
| 6,199,052 B1 | 3/2001 | Mitty et al. | |
| 6,260,145 B1* | 7/2001 | Komura et al. | ............. 713/176 |
| 6,308,277 B1 | 10/2001 | Vaeth et al. | |
| 6,385,655 B1 | 5/2002 | Smith et al. | |
| 6,715,073 B1* | 3/2004 | An et al. | .................... 713/156 |
| 2002/0062440 A1* | 5/2002 | Akama | ...................... 713/171 |

* cited by examiner

*Primary Examiner*—Kambiz Zand
*Assistant Examiner*—Tongoc Tran
(74) *Attorney, Agent, or Firm*—Christensen O'Connor Johnson Kindness PLLC

(57) ABSTRACT

A system and method for processing communications between a sender computing device and at least one recipient computing device are provided. A sender establishes a secure communication with a document processing server and requests the processing of an electronic document, which can include the appending of a digital signature. The document processing server processes the electronic document and establishes secure communications with one or more designated recipients. The document processing server can implement sender specified recipient identity verification and provide further processing of the electronic document as designated by the recipients.

45 Claims, 14 Drawing Sheets

SYSTEM AND METHOD FOR PROCESSING DIGITAL DOCUMENTS UTILIZING SECURE COMMUNICATIONS OVER A NETWORK

CROSS-REFERENCE TO RELATED APPLICATION

This application claims the benefit of U.S. Provisional Application No. 60/259,941 entitled METHOD FOR SECURELY SENDING AND SIGNING DIGITAL DOCUMENTS OVER THE INTERNET WITHOUT ANY KEY EXCHANGE OR USER-LEVEL CRYPTOGRAPHY MANAGEMENT and filed on Jan. 5, 2001. U.S. Provisional Application No. 60/259,941 is incorporated by reference herein.

FIELD OF THE INVENTION

In general, the present application relates to computer software, hardware and communication networks, and in particular, to a system and method for securely processing digital documents, including appending digital signatures, without requiring pre-established individual identity verification, digital certificates, end-user cryptography, key management or key exchange.

BACKGROUND OF THE INVENTION

Generally described, the ability for individuals to communicate, exchange information and make binding agreements in the form of enforceable contracts is an essential aspect of most business transactions. In the typical conventional embodiment, the execution of a contract between two or more parties requires the physical execution of a paper contract by each of the parties involved. If the parties are remote from each other, the contract is typically delivered to each respective party via a delivery service, such as the mail service. Accordingly, the execution of a contract can take some time and the previous signatories can have difficulty determining whether subsequent signatories have properly executed the contract and obtaining copies of the completely executed agreement.

The development of communication technologies has attempted to facilitate the execution of agreements between remote parties. In accordance with one conventional aspect, a first party executes an original contract and transmits a reproduction of the contract, such as through a facsimile device, to a subsequent signatory. The subsequent signatory executes an original signature of the reproduction and can then forward a reproduction to a next signatory for execution. Although the use of electronic reproduction devices, such as facsimile machines, facilitates the execution of agreements in a shorter time frame, this approach can be deficient for a number of reasons. In one aspect, repeated electronic reproductions of agreements and signatures can often degrade the legibility of the agreement. Additionally, similar to above-referenced embodiment, previous signatories can have difficulty determining whether subsequent signatories have properly executed the contract and obtaining copies of the completely executed agreement. Additionally, such technologies require signatures to be applied to non-original copies with non-original signatures on those copies.

The development of computing devices, such as personal computers, and communication networks, such as the Internet, has begun providing individuals with efficient means of transferring information, regardless of the physical location of the individuals. For example, the advent of word processing and communication software applications can allow two individuals to view, modify and transmit textual data, such as contracts, to a number of remote parties with little or no noticeable delay. However, because of the nature in which the data is transmitted over the communication network, the traditional transfer of data between computers is susceptible to unauthorized access of the data, unauthorized substitution of the data during transfer or while stored on computers or communication network components, and possible fraud. Accordingly, the traditional transfer of data between computers is deficient for creating, executing, and transferring legal documents, such as contracts.

One approach to securing documents from unauthorized access involves the use of mathematical encryption algorithms. In accordance with an encryption model, a sender scrambles the contents of an electronic document by applying a mathematical algorithm that can only be unscrambled by an authorized user having possession of an encryption key. In one conventional embodiment, the sender and recipient exchange a common encryption key known only to the sender and the recipient. This approach is generally referred to as a symmetric encryption key format. Although use of symmetric encryption keys can facilitate secure communications, this approach can become deficient because it requires the sender and recipient to securely share the symmetric key prior to establishing communications with one another. Accordingly, a transmission of a document to several parties would potentially require a sender to maintain a number of symmetric encryption keys. Moreover, the repeated use of the same encryption key could potentially allow an unauthorized user to discover the encryption key and compromise the security of the transmission.

In another encryption embodiment, the sender and recipient can exchange public encryption keys while maintaining private keys. This approach is generally referred to as an asymmetric encryption key format. In accordance with this embodiment, all communications directed to a party are encrypted with the party's public key, which can be readily distributed to a number of parties. The public key-encrypted document can only be decrypted by the party's private key, which does not need to be distributed. If the recipient maintains the integrity of the private key, he or she then becomes the only person who can decrypt and view the data.

Although the asymmetric encryption key approach does not require parties to agree upon a symmetric encryption key, this approach still requires the parties to exchange at least a public key, and for each communication to be encrypted according to the specific public keys distributed by each party. Likewise, the divulgence of the private key by the recipient, either on purpose (as a way to disavow the security of the transmission) or because it is unexpectedly acquired by an unauthorized party, could further compromise the security of the transmission.

In still another aspect, encryption can be implemented without requiring additional effort by the individual user. In accordance with this aspect, a user accesses a software application program that can establish encryption protocols between the communication servers on the network. For example, an Internet browser application can utilize encryption protocols such as a secure sockets layer ("SSL") and transport layer security ("TLS") for exchanging encryption keys with Internet Web servers. In accordance with these aspects, the end user is not required to initiate the encryption of any documents or the decryption, as it is done after the user submits data and prior to the user viewing the data.

The use of embedded encryption technology facilitates secure communication between two parties over a communication network. However, current implementations can become deficient in attempting to authenticate an identity of a user, such as for executing legally binding agreements. In one aspect, a user may manipulate a user interface, such as a graphical user interface, to click an "I agree" button. Although this approach allows for the recordation of some user intent to be bound, this approach is generally insufficient to establish the identity of the user, whether they expressed an indication to be bound, what exactly was agreed to, does not support agreements among more than two parties, and the electronic record created is not generally provided to all parties for future reference.

Another approach of establishing the identity of, and legally binding, a user involves the appending of a digital signature to an electronic document and encoding the digital signature using asymmetric encryption technology. In this embodiment, the user would append an electronic signature to a digital document and encrypt the digital signature with the user's private key. Upon receipt of the electronically signed document, a recipient could verify the validity of the electronic signature by using the public key of the user to verify the contents. Without the private key, neither the digital signature nor the document could be altered in any manner without allowing all the parties to know it had been altered. However, as previously stated, the use of asymmetric encryption technologies still requires users to exchange public keys and be able to utilize encryption tools. Moreover, many of these approaches utilize third-party companies that must issue digital certificates of authentication to establish the identities of the signatories' public keys. Such digital certificates must be established prior to communications and must also be exchanged between communicating parties.

Based on the above-described deficiencies associated with encryption technology in general, and its application to verifying the identity of and establishing legally binding electronic signatures, there is a need for a system and method for securely transferring and processing the documents, including affixing digital signatures and implementing varied levels of user identification.

SUMMARY OF THE INVENTION

A system and method for processing communications between a sender computing device and at least one recipient computing device are provided. A sender establishes a secure communication with a document processing server and requests the processing of an electronic document, which can include the appending of a digital signature. The document processing server processes the electronic document and establishes secure communications with one or more designated recipients. The document processing server can implement sender specified recipient identity verification and provide further processing of the electronic document as designated by the recipients.

In accordance with an aspect of the present invention, a method for processing communications between a sender and at least one recipient is provided. A document processing server obtains a request to transmit an electronic document to at least one recipient and obtains an electronic document corresponding to the request from the sender. The document processing server processes the electronic document, which includes encrypting the electronic document with an encryption key corresponding to the designated at least one recipient. The document processing server establishes a communication channel with the designated at least one recipient and transmits the processed electronic document to the designated at least one recipient. However, the sender and the designated at least one recipient do not exchange encryption keys.

In accordance with another aspect of the present invention, a system for processing communications is provided. The system includes a sender computing device operable to transmit a request to process an electronic document and at least one recipient computing device corresponding to an identifiable communication channel. The system further includes a document processing server operable to establish secure communications with the sender computing device and the at least one recipient computing device. The document processing server processes an electronic document and transmits the processed electronic document between the sender computing device and the recipient computing device without the sender computing device and the at least one recipient computing device exchanging encryption keys.

In accordance with a further aspect of the present invention, a computer-readable medium having computer-executable components for processing communications between a sender and at least one recipient is provided. The computer-executable components include an interface component operable to establish secure communication with the sender computing device and the recipient computing device without requiring the exchange of encryption keys between the sender computing device and the recipient computing device. The computer-executable components also include a document processing component operable to process document requests from the sender computing device and append at least an electronic signature corresponding to a sender.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
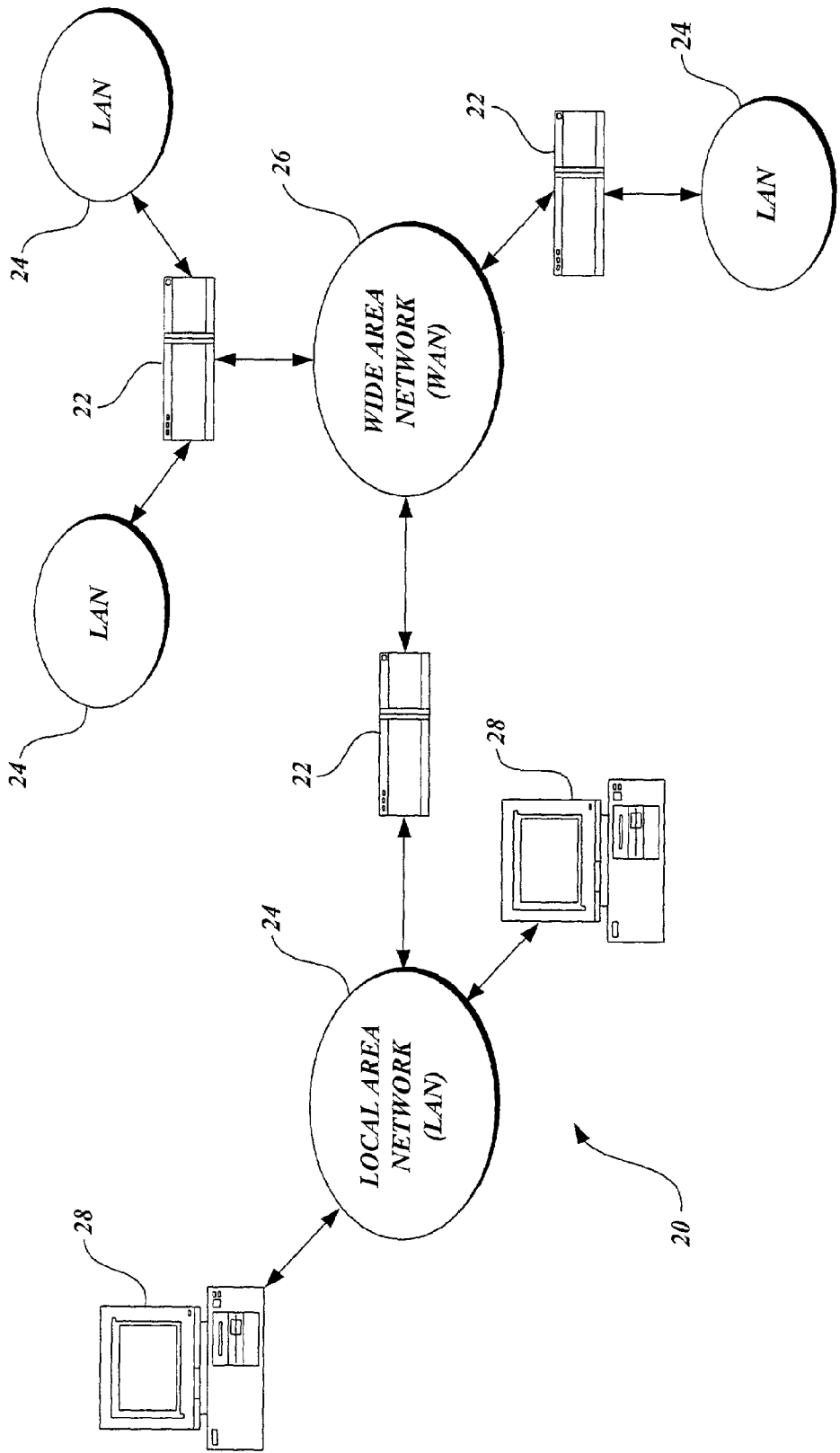
FIG. 1 is a block diagram illustrative of a representative portion of the Internet.

As described above, aspects of the present invention are embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. A representative section of the Internet 20 is shown in FIG. 1, where a plurality of local area networks ("LANs") 24 and a wide area network ("WAN") 26 are interconnected by routers 22. The routers 22 are special purpose computers used to interface one LAN or WAN to another. Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art.

Furthermore, computers 28 and other related electronic devices can be remotely connected to either the LANs 24 or the WAN 26 via a digital communications device, modem and temporary telephone, or a wireless link. It will be appreciated that the Internet 20 comprises a vast number of such interconnected networks, computers, and routers and that only a small, representative section of the Internet 20 is shown in FIG. 1.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in HyperText Markup Language ("HTML"), or other markup languages, that are electronically stored at or dynamically generated by "WWW sites" or "Web sites" throughout the Internet. Additionally, client-side software programs that communicate over the Web using the TCP/IP protocol are part of the WWW, such as JAVA® applets, instant messaging, e-mail, browser plug-ins, Macromedia Flash, chat and others. Other interactive hypertext environments may include proprietary environments such as those provided in America Online or other online service providers, as well as the "wireless Web" provided by various wireless networking providers, especially those in the cellular phone industry. It will be appreciated that the present invention could apply in any such interactive communication environments, however, for purposes of discussion, the Web is used as an exemplary interactive hypertext environment with regard to the present invention.

A Web site is a server/computer connected to the Internet that has massive storage capabilities for storing hypertext documents and that runs administrative software for handling requests for those stored hypertext documents as well as dynamically generating hypertext documents. Embedded within a hypertext document are a number of hyperlinks, i.e., highlighted portions of text which link the document to another hypertext document possibly stored at a Web site elsewhere on the Internet. Each hyperlink is assigned a Uniform Resource Locator ("URL") that provides the name of the linked document on a server connected to the Internet. Thus, whenever a hypertext document is retrieved from any web server, the document is considered retrieved from the World Wide Web. Known to those skilled in the art, a web server may also include facilities for storing and transmitting application programs, such as application programs written in the JAVA® programming language from Sun Microsystems, for execution on a remote computer. Likewise, a web server may also include facilities for executing scripts and other application programs on the web server itself.

A remote access user may retrieve hypertext documents from the World Wide Web via a web browser program. A web browser, such as Netscape's NAVIGATOR® or Microsoft's Internet Explorer, is a software application program for providing a user interface to the WWW. Upon request from the remote access user via the web browser, the web browser requests the desired hypertext document from the appropriate web server using the URL for the document and the HyperText Transport Protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the web server, such as JAVA applets, for execution on the client computer. Finally, the WWW browser may include optional software components, called plug-ins, that run specialized functionality within the browser.

The present application is directed toward a system and method for securely processing of digital documents between a sender and one or more recipients without requiring individual security verification between the parties. Specifically, the present invention is directed toward a system and method for appending digital signatures to a document and securely transferring the document in a networked environment. Although the present invention will be described in regards to an implementation with an illustrative document processing system, one skilled in the relevant art will appreciate that the disclosed transaction processing system and the disclosed embodiments are illustrative in nature and should not be construed as limiting.

Figure 2:
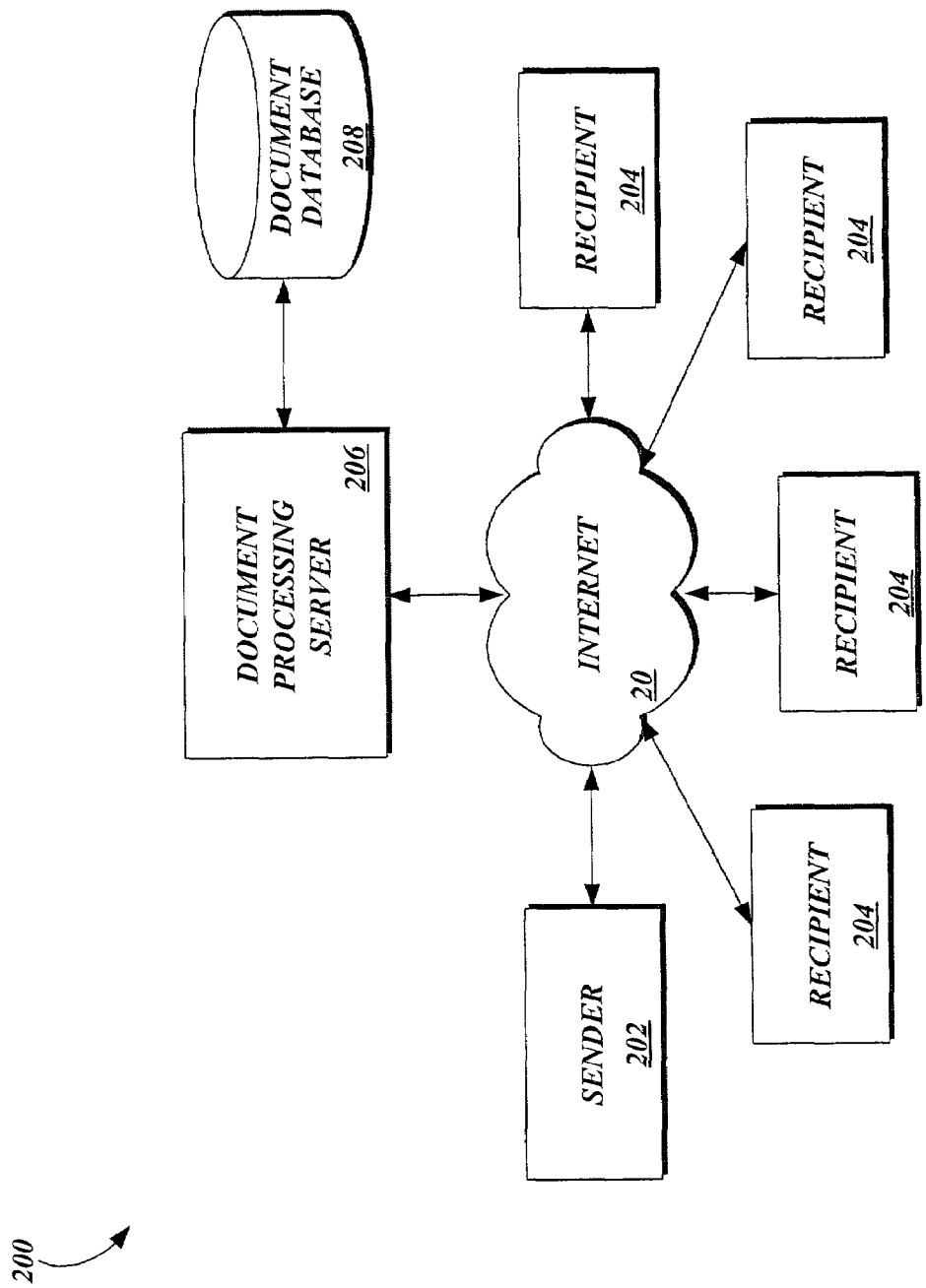
FIG. 2 is a block diagram of a document processing system formed in accordance with the present invention.

Referring now to FIG. 2, an interactive document processing system 200 for processing digital documents between a number of parties involved in a transaction will be described. In accordance with an illustrative embodiment of the present invention, the document processing system 200 includes a sender computing device 202 operable to generate requests for processing one or more electronic documents and to generate the electronic documents for processing. One skilled in the relevant art will appreciate that the electronic documents can include electronic mail message, word processing files, computer data files, HTML Web pages, XML documents, and any other digitally encoded electronic file. As will be explained in greater detail below, the processing of the electronic documents can include the transmittal of the document to specified recipients. Additionally, the processing of the document can include the incorporation of additional information, such as the appending of digital signatures, to the electronic documents.

The interactive document processing system 200 can also include one or more recipient computing devices 204 operable to receive the processed electronic documents. Although the sender computing device 202 and the recipient computing device 204 are illustrated as distinct components, one skilled in the relevant art will appreciate that the utilization of "sender" and "recipient" designates which party initiates the transfer and processing of the electronic documents.

In accordance with an illustrative embodiment of the present invention, a document processing server 206 facilitates the transfer and processing of the electronic documents between the sender computing device 202 and the one or more recipient computing devices 204. As will be explained in greater detail below, the document processing server 206 includes a document database 208 for storing sender and recipient encryption keys for storing copies of processed electronic documents and for storing data regarding the status of and attributes associated with the processed electronic documents. The document processing server 206 communicates with the sender computing device 202 and the recipient computing devices 204 via a wide area network, such as the Internet. More specifically, in an illustrative embodiment of the present invention, the document processing server 206 utilizes Web browser communications to establish secure communications via a secure sockets layer ("SSL") communication channel with the sender computing device 202 and/or the recipient computing devices 206. However, one skilled in the relevant art will appreciate that the present invention is not limited to its application to a wide area network, the World Wide Web, or the Internet.

Figure 3:
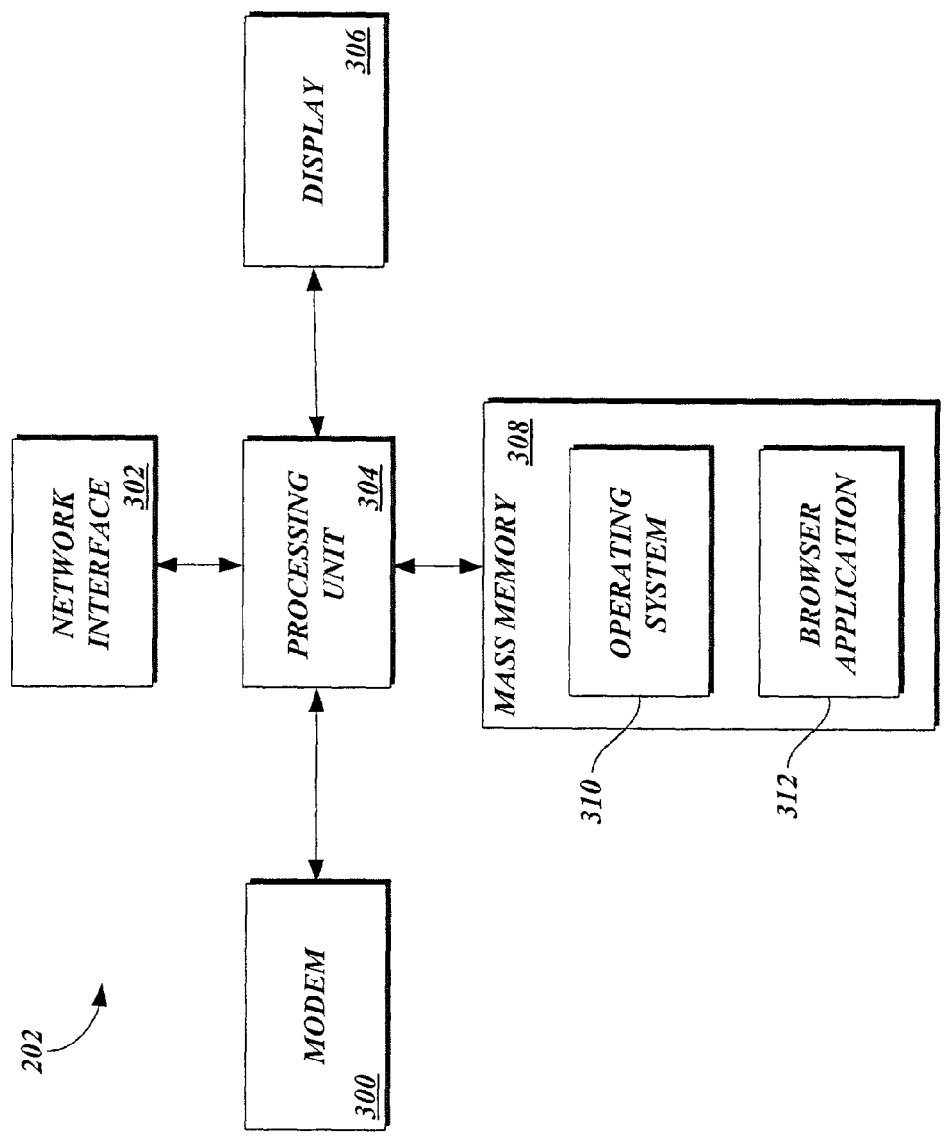
FIG. 3 is a block diagram depicting an illustrative architecture for a sender or recipient computing device in accordance with the present invention.

FIG. 3 depicts several of the key components of a computing device that may be utilized by a sender or a recipient. Accordingly, the computing device will be referred to as a sender computing device 202 and/or a recipient computing device 204 (FIG. 2). Those of ordinary skill in the art will appreciate that the computing device includes many more components than those shown in FIG. 3. However, it is not necessary that all of these generally conventional components be shown in order to disclose an illustrative embodiment for practicing the present invention.

As shown in FIG. 3, the computing device may include a modem 300 for connecting to an Internet service provider through a Point-to-Point Protocol ("PPP") connection or a Serial Line Internet Protocol ("SLIP") connection as known to those skilled in the art. The modem 300 may utilize a telephone link, cable link, wireless link, Digital Subscriber Line or other types of communication links known in the art. The computing device may also include a network interface 302 for connecting directly to a LAN or a WAN, or for connecting remotely to a LAN or WAN. Those of ordinary skill in the art will appreciate that the network interface 302 includes the necessary circuitry for such a connection, and is also constructed for use with various communication protocols, such as the TCP/IP protocol, the Internet Inter-ORB Protocol ("IIOP"), X.25 and the like. The network interface 302 may utilize the communication protocol of the particular network configuration of the LAN or WAN it is connecting to, and a particular type of coupling medium.

The computing device also includes a processing unit 304, a display 306, and a memory 308. The memory 308 generally comprises a random access memory ("RAM"), a read-only memory ("ROM"), and a permanent mass storage device, such as a hard disk drive, tape driver, optical drive, floppy disk drive, CD-ROM, DVD-ROM, or removable storage drive. The memory 308 stores an operating system 310 for controlling the operation of the sender computing device 202. The memory 308 also includes a WWW browser 312, such as Netscape's NAVIGATOR® or Microsoft's INTERNET EXPLORER® browser, for accessing the document processing system via the WWW. As will be explained in greater detail below, the WWW browser 312 can include secure communication functionality, such as an SSL connection, for establishing encrypted communications between the computing device and the document processing server 206.

It will be appreciated that these components may be stored on a computer-readable medium and loaded into memory 308 of the computing device using a drive mechanism associated with the computer-readable medium, such as a floppy disk drive, CD-ROM, DVD-ROM drive, or network interface 302. The memory 308, display 306, modem 300 and network interface 302 are all connected to the processor 304 via a bus. Other peripherals may also be connected to the processor in a similar manner. Additionally, one skilled in the relevant art will appreciate that the sender computing device 202 and/or recipient computing device 204 may be embodied in a variety of computing devices including desktop personal computers, server computers, hand-held computers, personal digital assistants, mobile communication devices, and the like.

Figure 4:
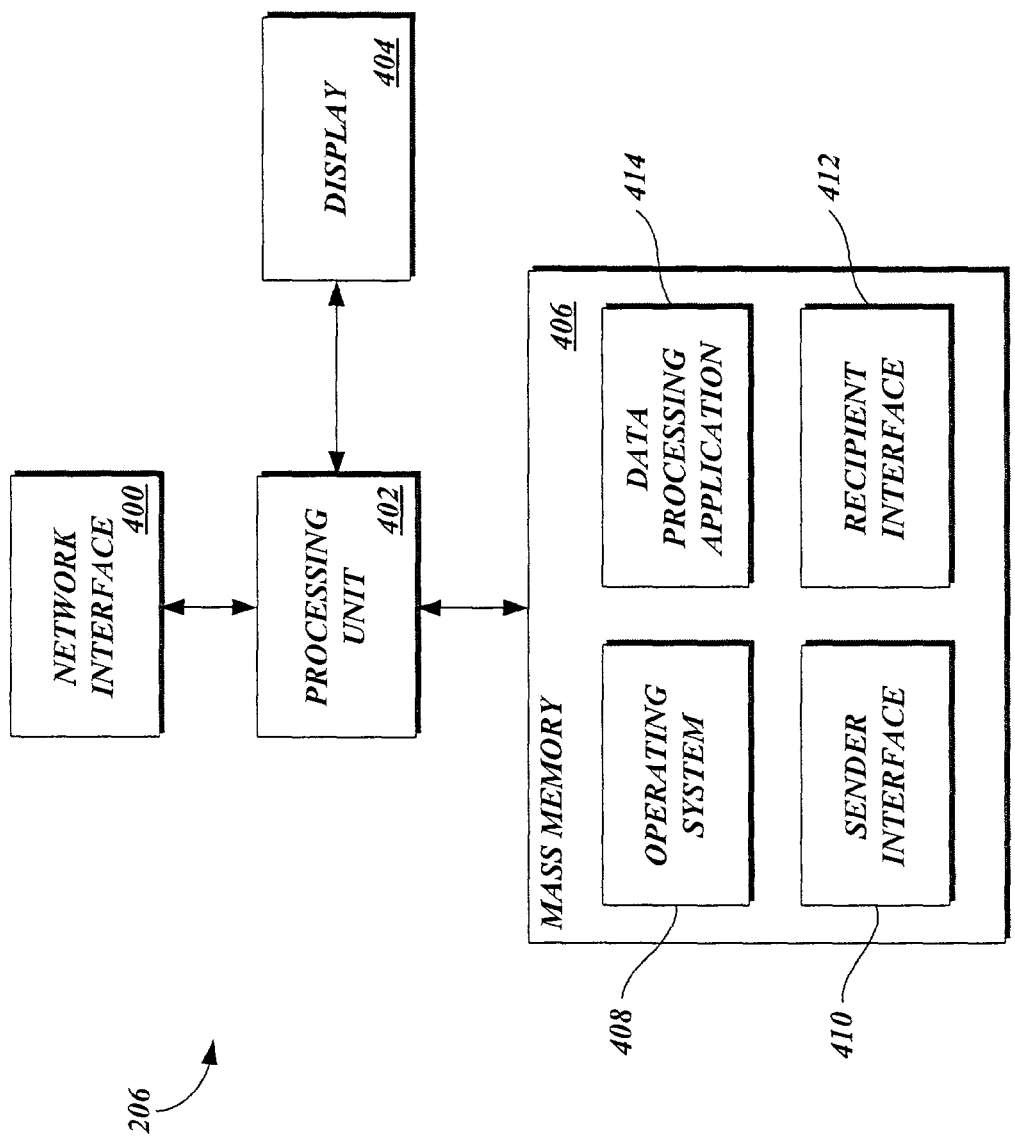
FIG. 4 is a block diagram depicting an illustrative architecture for a document processing server in accordance with the present invention.

FIG. 4 is a block diagram depicting an illustrative architecture of a document processing server 206 (FIG. 2) in accordance with the present invention. Those of ordinary skill in the art will appreciate that the document processing server 206 includes many more components than those shown in FIG. 4. However, it is not necessary that all of these generally conventional components be shown in order to disclose an illustrative embodiment for practicing the present invention. One skilled in the relevant art will appreciate that the transaction processing server 206 may contain multiple processing units 402 and may run various operations on more than one computer/server using a distributed processing architecture connected via a communications network. As shown in FIG. 4, the document processing server 206 is connected to the Internet 20 via a network interface 400. Those of ordinary skill in the art will appreciate that the network interface 400 includes the necessary circuitry for connecting the transaction processing server 206 to the Internet 20, and is constructed for use with the TCP/IP protocol, or other protocols, such as IIOP or X.25.

The document processing server 206 also includes a processing unit 402, an optional display 404 and a mass memory 406, all connected via a communication bus, or other communication device. The mass memory 406 generally comprises a RAM, ROM, and a permanent mass storage device, such as a hard disk drive, tape drive, optical drive, floppy disk drive, or combination thereof. The mass memory 406 stores an operating system 408 for controlling the operation of the transaction processing server 206. It will be appreciated that this component may comprise a general-purpose server operating system as is known to those skilled in the art, such as UNIX, LINUX™, or Microsoft WINDOWS NT®.

The mass memory 406 also stores program code and data for interfacing with one or more senders and one or more recipients for processing document data between each party. More specifically, the mass memory 406 stores a sender interface application 410 in accordance with the present invention for presenting a sender with various document processing information, obtaining sender transaction inquiries and obtaining subsequent sender document processing actions. The sender interface application 410 comprises computer-executable instructions which, when executed by the transaction processing server 206, transmits and receives sender data as will be explained below in greater detail. The mass memory 406 also stores a recipient interface application program 412 for transmitting document information to recipient computing devices 204 and for obtaining completed transaction information from recipient computing devices. The operation of the recipient interface application 412 will be described in greater detail below. Although the mass memory 406 is illustrated as including separate interface applications 410, 412 for senders and recipients, one skilled in the relevant art will appreciate that the mass memory may utilize a single interface application for communicating with sender computing devices 202, recipient computing devices 204, and any additional party in the document processing system 200.

The mass memory 406 further stores a data processing application 414 for associating sender and recipient data to a digital document and for maintaining document security. The operation of the data processing application 414 will be described in greater detail below. It will be appreciated that these components may be stored on a computer-readable medium and loaded into the memory 406 of the document processing server 206 using a drive mechanism associated with the computer-readable medium, such as a floppy, CD-ROM, DVD-ROM drive, or network interface 400.

Figure 5:
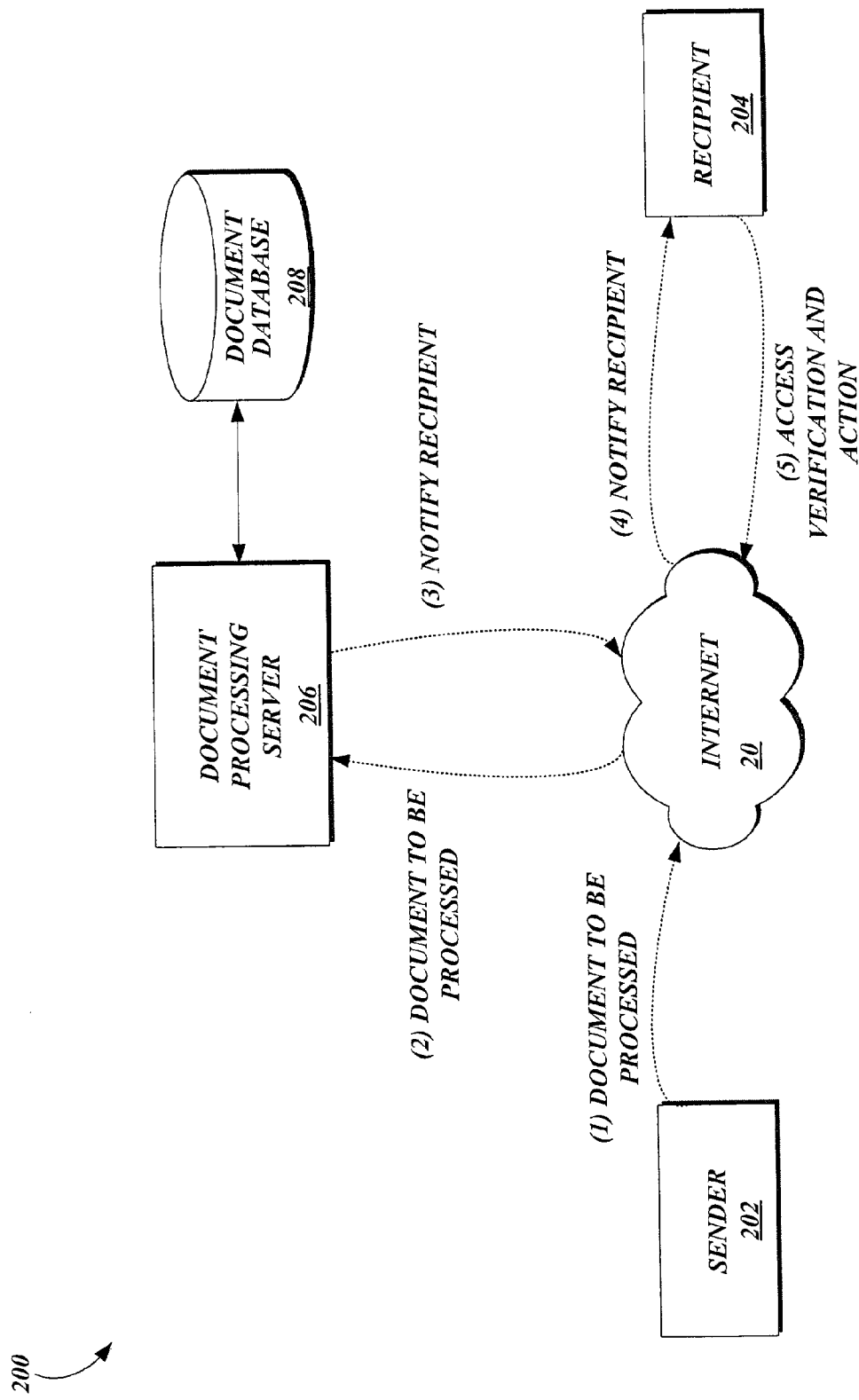
FIG. 5 is a block diagram of the document processing system of FIG. 2 illustrating the initiation and processing of a document transfer by a sender computing device to a recipient computing device in accordance with the present invention.

Referring now to FIGS. 5-8, a number of embodiments implementing various aspects of the present invention will be described. With reference to FIG. 5, a sender computing device 202 initiates the processing of the document by submitting a request to the document processing server 206. In an illustrative embodiment of the present invention, the request is transmitted in the form of an HTTP POST request utilizing a Web browser SSL connection with the document processing server 206. The initiation of a request may include the registration of the sender with the document processing server 206. Alternatively, the sender may be pre-registered and may submit a request by a type of login function. The document processing request can include a specification of one or more tasks that are to be performed to the document and a specification of one or more recipient computing devices 204 that are to receive the processed document. In an illustrative embodiment of the present invention, the specification of one or more recipient computing devices utilizes Internet electronic mail addresses.

Upon receiving the request and the electronic document from the sender computing device 202, the document processing server 206 can encrypt the document for storage in the processed document database 208, process the electronic document and encrypt the document for transmittal to the designated recipients. In an illustrative example, the processing of the electronic document can include the appending/logically associating and encrypting of the sender's digital signature to the electronic document. Upon completion of the processing, the document processing server 206 notifies the recipient of the availability of the processed electronic document. In an illustrative embodiment of the present invention, the document processing server 206 notifies the recipient via an electronic mail message sent to an electronic mail address corresponding to the recipient. The electronic mail message can include a unique identifier, such as in the form of an embedded hyperlink, that will allow the recipient to access the document processing server 206.

Figure 6:
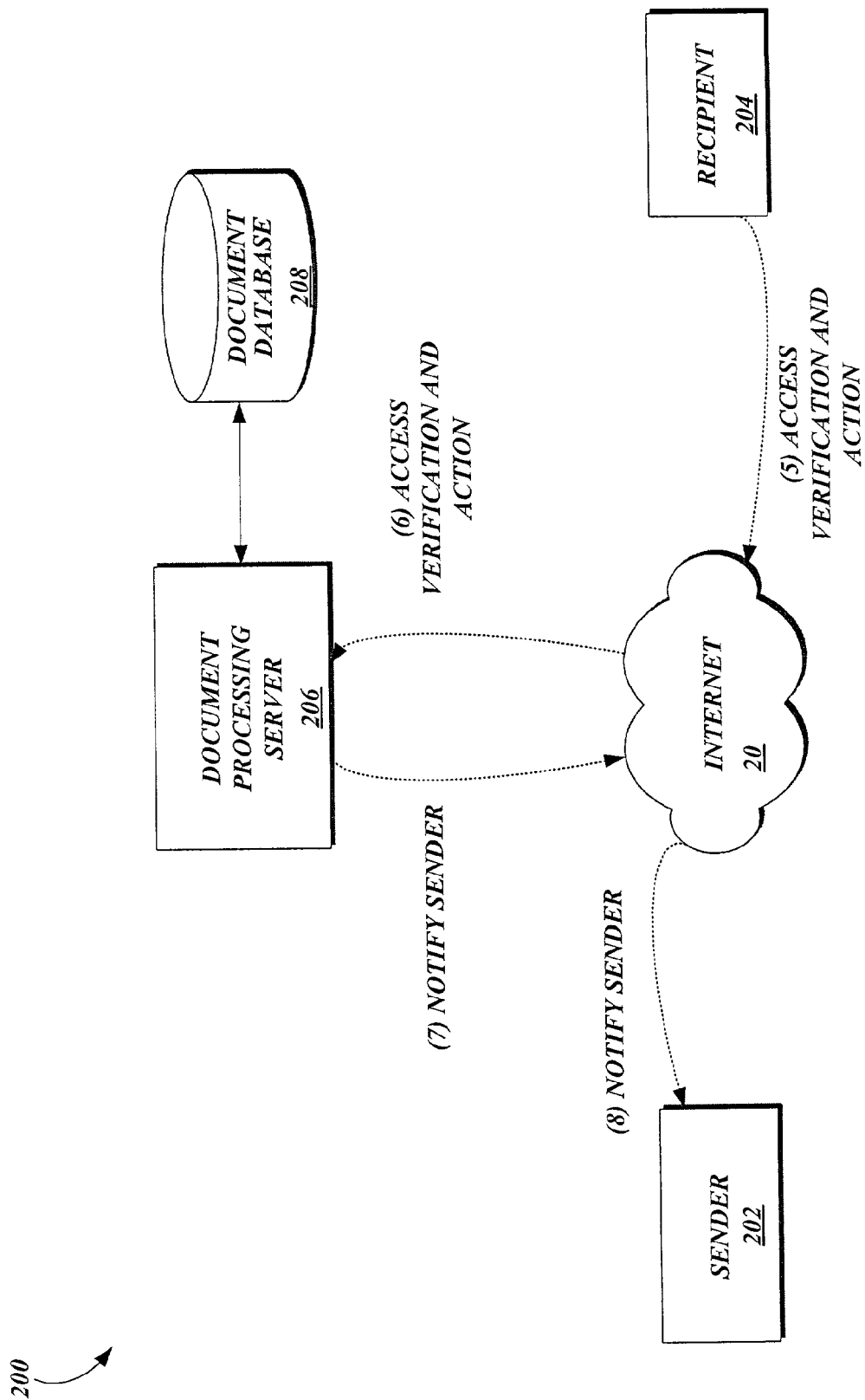
FIG. 6 is a block diagram of the document processing system of FIG. 2 illustrating the processing of the document by a recipient computing device in accordance with the present invention.

With reference to FIG. 6, the designated recipient computing device 204 communicates with the document processing server 206 to access the electronic document and to initiate additional processing to the electronic document. In an illustrative embodiment of the present invention, the sender computing device 202 may specify some form of identity verification for the recipient. For example, the lowest form of identity verification is the possession of the unique identifier transferred in the notification electronic mail message. Other forms of identity verification can include the use of password protection and the use of third-party verification services, such as the issuance of a digital certificate. Additionally, the sender computing device 202 may be able to specify different levels of identity verification for each recipient. Upon verifying the identity of the recipient, the document processing server 206 can transmit the document to the recipient computing device via a SSL connection and subsequently process the document according to the recipient's instruction. For example, the document processing server 206 may append and encrypt the signature of the recipient to the electronic document. Upon completion of the additional processing, the document processing server 206 can notify the sender computing device 202.

Figure 7:
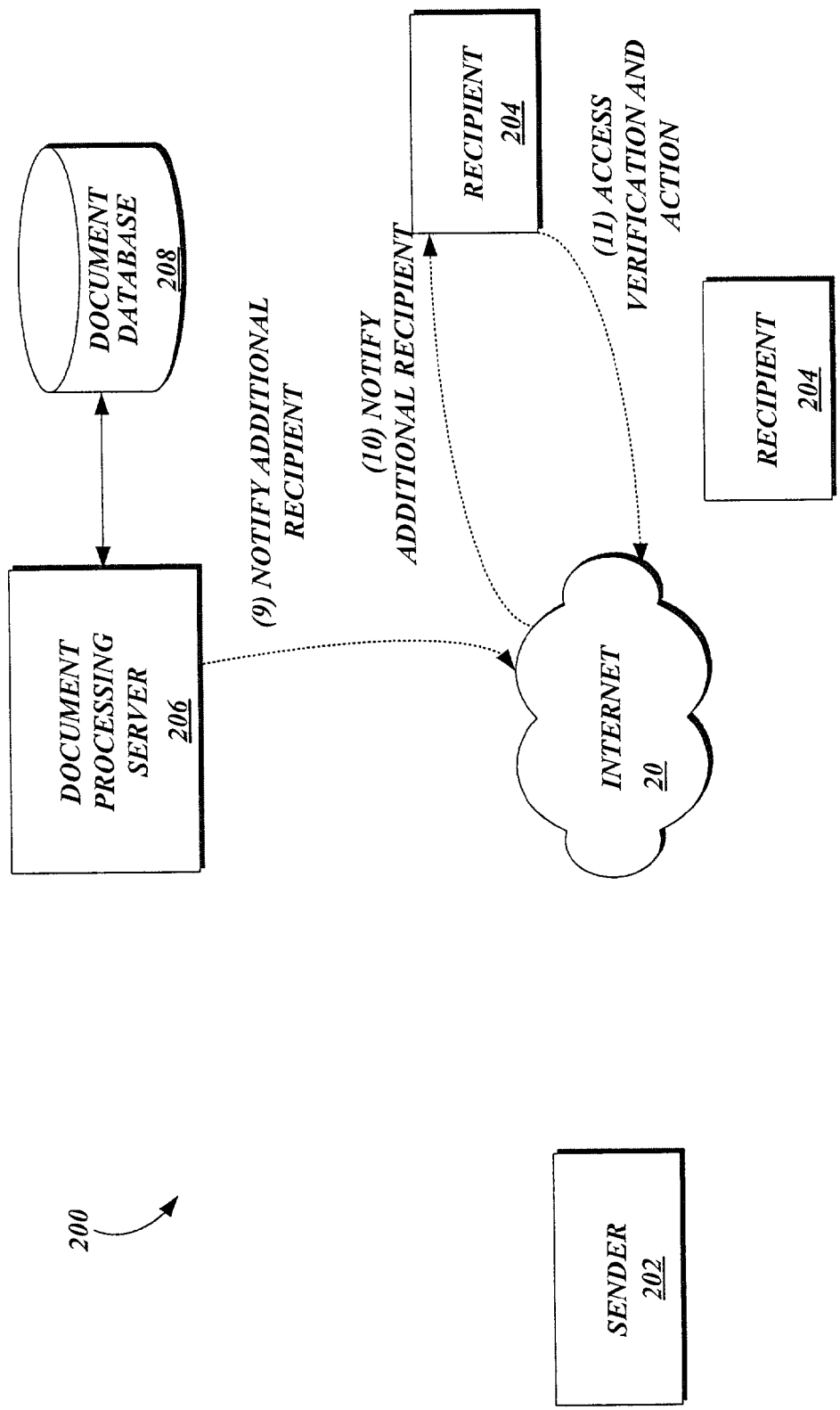
FIG. 7 is a block diagram of the document processing system of FIG. 2 illustrating document transfer by a sender computing device to a second recipient computing device in accordance with the present invention.
Figure 8:
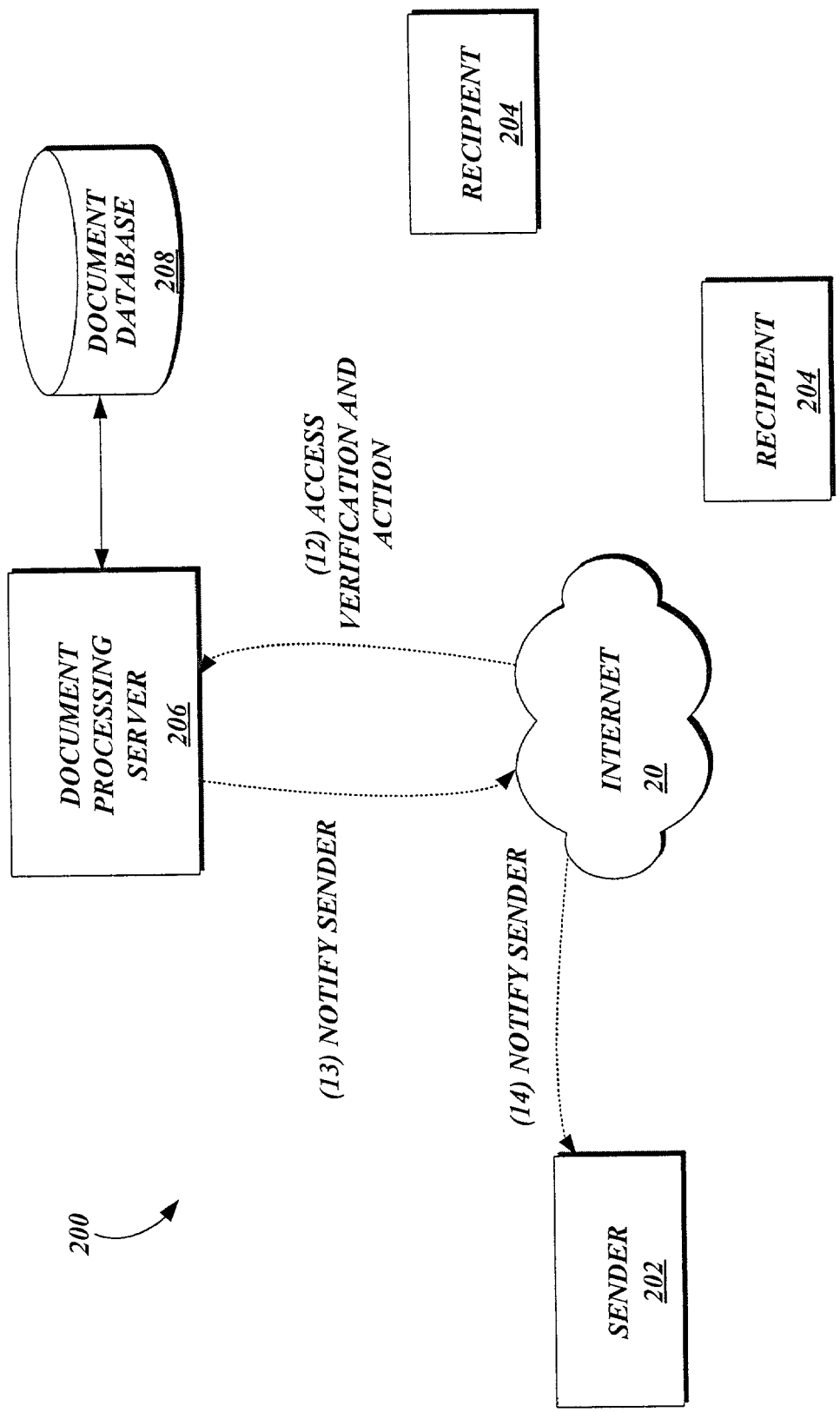
FIG. 8 is a block diagram of the document processing system of FIG. 2 illustrating the processing of the document by a second recipient computing device in accordance with the present invention.

With reference to FIGS. 7 and 8, in an illustrative embodiment of the present invention, additional recipient computing devices 204 may be designated by either the sender computing device 202 or another recipient to receive the processed electronic document. In one embodiment, each recipient may be transmitted the processed electronic document in a sequential order. Alternatively, two or more recipients may be transmitted the electronic document concurrently. Similar to the first recipient computing device 204, the second recipient computing device 204 receives an electronic mail message including a unique identifier in the form of an embedded hyperlink. By manipulating the hyperlink, the second recipient computing device gains access to the document processing server 206 and establishes a SSL connection with the document processing server. In an illustrative embodiment of the present invention, the document processing server 206 maintains copies of the processed electronic document in the document database 208 encrypted in party specific encryption key. For example, the document to be delivered to the second recipient computing device 204 would be encrypted in an encryption key specified solely of for the second recipient computing device.

As explained above, the second recipient computing may have a specific type of identity verification prior to being given access. Upon gaining access, the document processing server 206 transmits the processed electronic document to the recipient computing device 202 and can initiate additional processes as specified by the recipient computing device. Upon completion of the tasks, the document processing server 206 can notify the sender computing device 202, as well as any additional parties such as the first recipient computing device 204, of the completed tasks. The process can continue to proceed to any number of additional recipient computing devices 204 and/or be returned for additional processing by the sender computing device 202 and any previous recipient computing devices 204.

Figure 9:
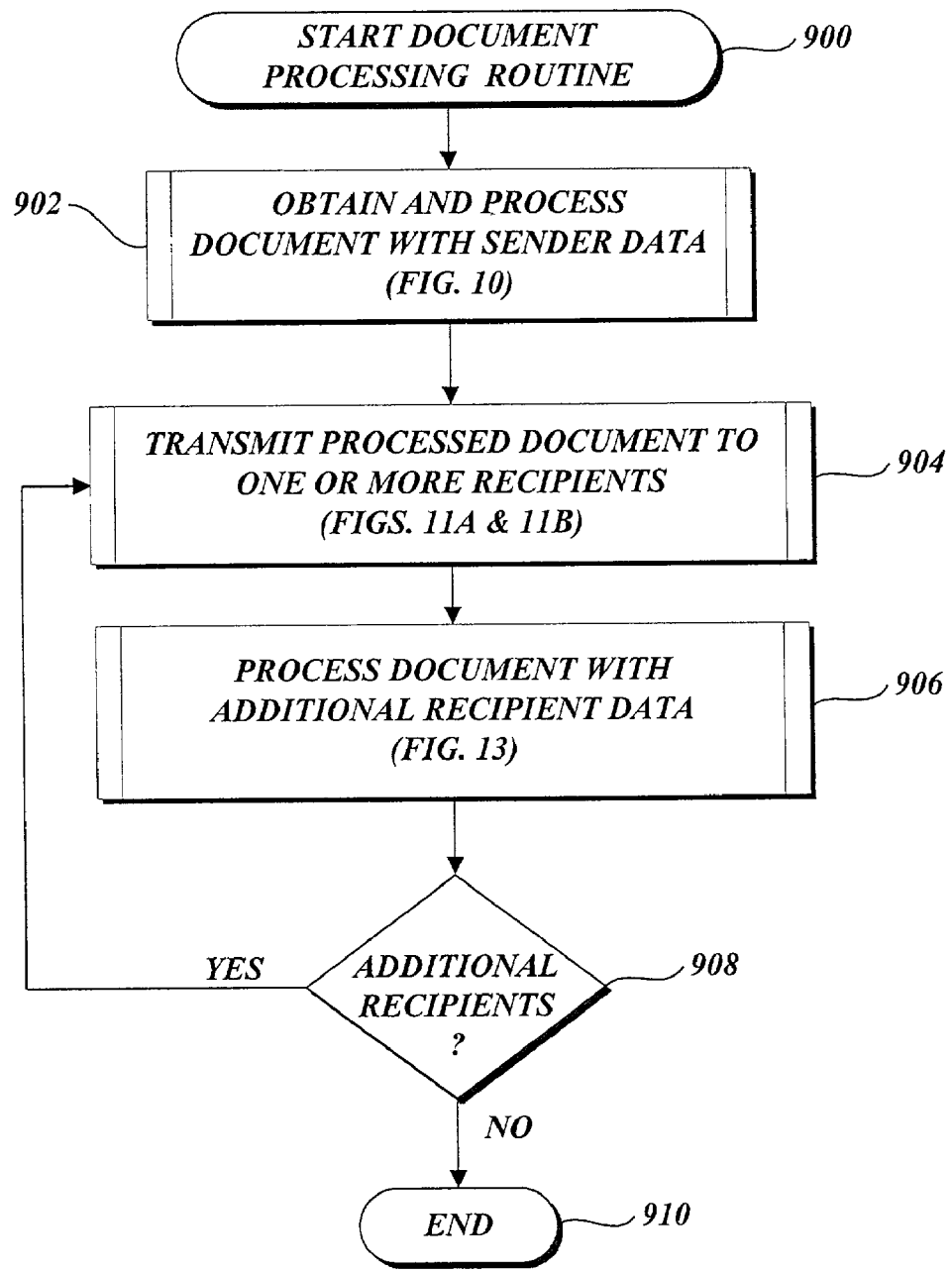
FIG. 9 is a flow diagram illustrative of an electronic document processing routine implemented by a document processing server in accordance with the present invention.
Figure 10:
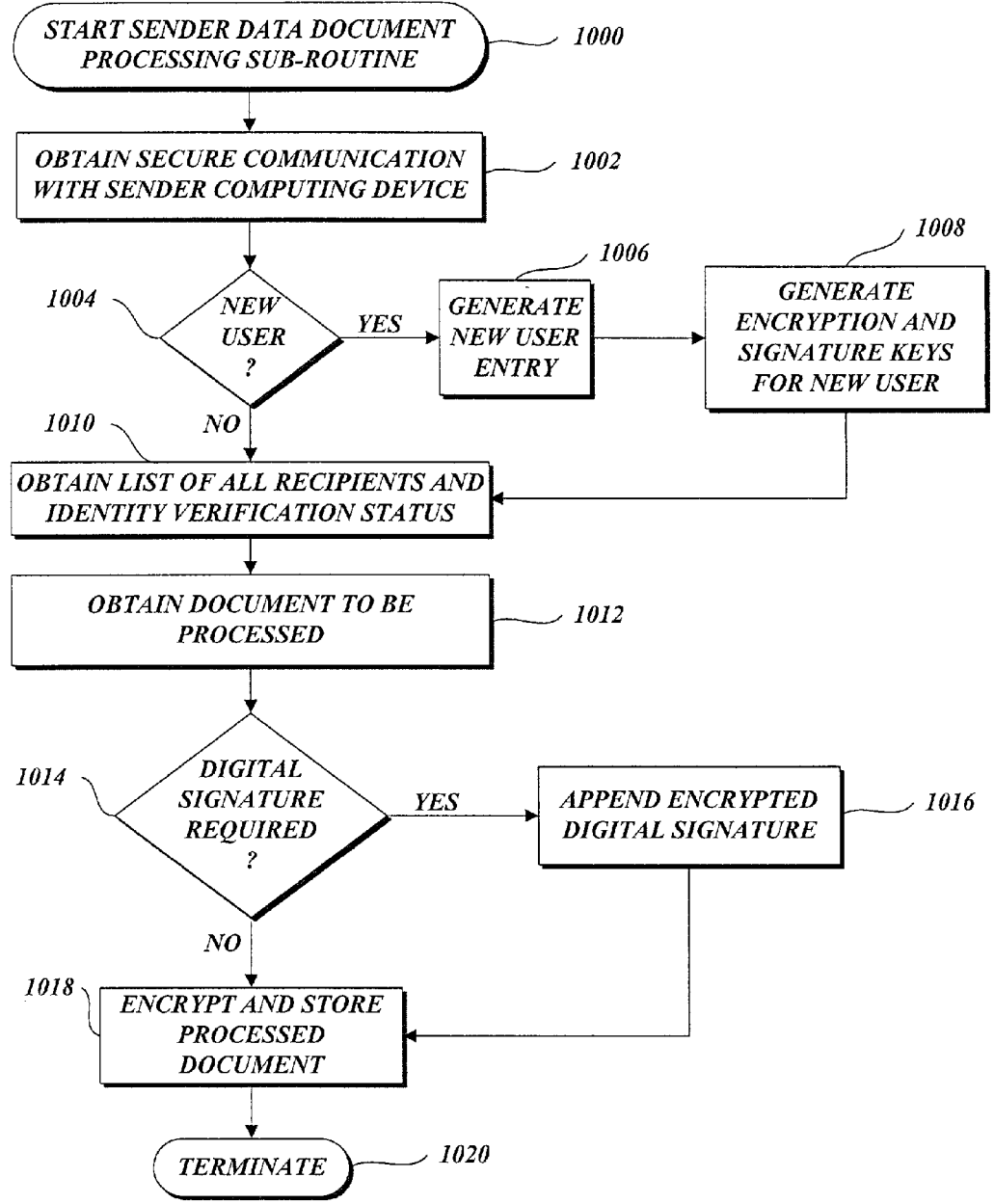
FIG. 10 is a flow diagram illustrative of a sender data document processing sub-routine implemented by a document processing server in accordance with the present invention.

With reference now to FIGS. 9-13, illustrative routines implemented by the document processing server 206 in accordance with the present invention will be described. FIG. 9 is a flow diagram illustrative of an electronic document processing routine 900 in accordance with the present invention. At block 902, the sender interface application 410 of the document processing server 206 obtains a sender computing device 202 request to process an electronic document and the data processing application 414 processes a corresponding electronic document. At block 904, the recipient interface device transmits the processed electronic document to one or more designated recipient computing devices 204. At block 906, the data processing application 414 process the corresponding electronic document according to instructions specified by the designated recipient computing device 204. At decision block 908, a test is conducted to determine whether additional recipient computing devices 204 have been designated by the either the seller computing device 202 or previously designated recipient computing devices 204. If additional recipient computing devices 204 remain, the routine 900 returns to block 904 for each additional recipient computing device 204. If no additional recipient computing devices 204 remain, the routine 900 terminates at block 910.

With reference again to block 902, FIG. 10 is a flow diagram illustrative of a sender data processing sub-routine 1000 implemented by the document processing server 206 in accordance with the present invention. At block 1002, the sender interface application 410 obtains a secure communication channel with the sender computing device 202. In an illustrative embodiment of the present invention, the sender interface application 410 establishes a Web-based secure sockets layer ("SSL") communication channel with the browser application 312, or other communication application, of the sender computing device 202. One skilled in the relevant art will appreciate that a SSL communication channel is a server-based encryption exchange that does not require additional effort on the part of a computer user to manipulate. However, one skilled in the relevant art will appreciate that alternative secure communication methods may be implemented within the scope of the present invention.

At block 1004, a test is conducted to determine whether a sender corresponding to the sender computing device 202 is a new user. In an illustrative embodiment of the present invention, the sender computing device 202 may have to a user login or have resident some type of identifier, such as a computer cookie, digital certificate, smart card and the like, that is recognized by the sender interface application 410. If the sender is a new user, at block 1006, the sender interface application 410 generates a new user record in the database 208. The sender interface application 410 may also require the sender computing device 202 to submit additional user information and/or require some type of financial subscription. At block 1008, the data processing application 414 generates encryption and signature keys for the new user. As will be explained in greater detail below, the encryption and signature keys will be utilized to store the electronic documents and encoded digital signatures after they have been appended, or otherwise logically associated, to an electronic document.

If the sender is not a new user, or once a new user has been registered, at block 1010, the sender interface application obtains a list of all intended recipient computing devices 204 and a respective identity verification for each recipient computing device. In an illustrative embodiment of the present invention, each recipient computing device 204 corresponds to an identifiable communication channel, such as a unique electronic mail address, that is operable to obtain the electronic document. Additionally, the sender computing device 202 may specify, such as through a Web page interface or a programmatic interface, a dynamic identity verification procedure for each designated recipient computing device 204.

One aspect of the dynamic identity verification involves only the ability to access and respond to the electronic mail message sent by the recipient interface application 412. In an actual embodiment of the present invention, the recipient interface application 412 includes an embedded hyperlink, including a unique identifier, that provides a secure login access to a document server 206 Web page when manipulated by a recipient. Accordingly, the lowest level of identify verification assumes that access to the electronic mail establishes the recipient's right to the document. A second aspect of the dynamic identity verification involves the combination of the hyperlink coupled with the requirement for the recipient computing device 204 to utilize an additional password agreed to by the parties. A third aspect of the dynamic identity verification involves the combination of the hyperlink, an optional additional password agreed by the parties and the utilization of a third-party service that establishes the identity of the recipient. For example, the recipient computing device 204 may be required to have a third-party service issue a digital certificate or other authorization code verifying the identity of the user. One skilled in the art will appreciate that additional or alternative identity verification levels may be established.

At block 1012, the sender interface application obtains the electronic document to be processed. At block 1014, a test is conducted to determine whether a digital signature is required. In an illustrative embodiment of the present invention, the document processing server 206 may be utilized solely to securely transmit documents from a sender computing device 202 to one or more recipient computing devices 204. Additionally, the document processing server 206 may be instructed to do additional processing to the document, including, but not limited to, the appending of digital signatures to the document. If a digital signature is required, a block 1016, the data processing application 414 calculates a digital signature corresponding to the sender identified with the sender computing device 202 and encrypts the signature using the signature key. In an illustrative embodiment of the present invention, the data processing application 414 utilizes an asymmetric encryption key to encrypt the signature to allow additional parties to verify that the signature without being able to modify the signature or its corresponding document without detection. In an illustrative embodiment of the present invention, the data processing application 414 logically associates the encrypted digital signature to the corresponding document. Alternatively, the encrypted digital signature may be appended to the original document.

At block 1018, the data processing application 414 encrypts the electronic document with the sender encryption key for storage in the document database 208. One skilled in the relevant art will appreciate that the sender encryption key may be a one-time symmetric encryption key that is not distributed. At block 1020, the sub-routine 1000 terminates.

Figure 11A:
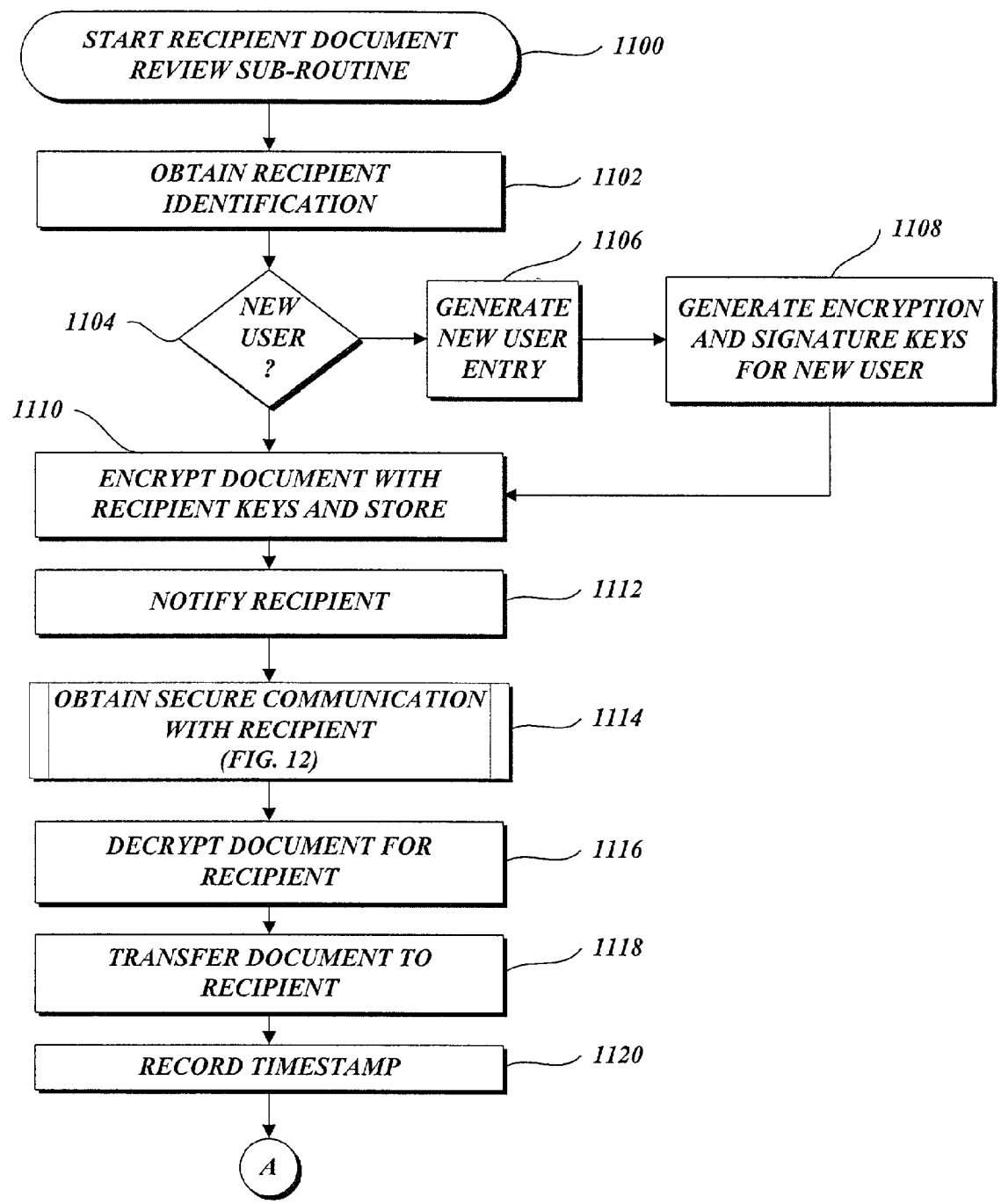
FIGS. 11A and 11B are flow diagrams illustrative of a recipient document review sub-routine implemented by a document processing server in accordance with the present invention.
Figure 11B:
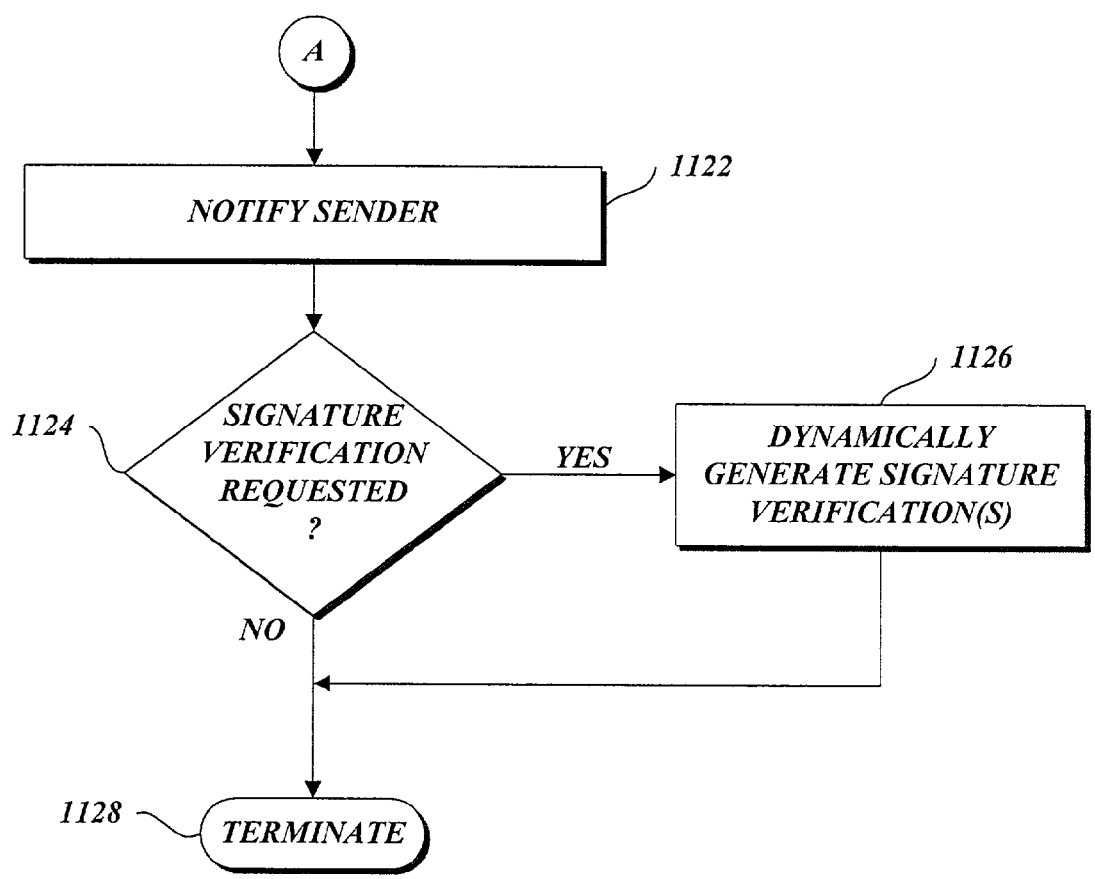

With reference again to block 904 (FIG. 9), FIGS. 11A and 11B are illustrative of a recipient document review sub-routine 1100 implemented by the document processing server 206 in accordance with the present invention. With reference to FIG. 11A, at block 1102, the data processing application 414 obtains the identification of the next recipient computing device 204. At block 1104, a test is conducted to determine whether the designated recipient is a new user. If the designated recipient is a new user, at block 1106, the recipient interface application 412 generates a new user record in the database 208. At block 1108, the data processing application 414 generates encryption and signature keys for the new user. As will be explained in greater detail below, the encryption and signature keys will be utilized to store the electronic documents and encoded digital signatures after they have been appended to an electronic document.

If the recipient is not a new user, or once a new user has been registered, at block 1110, the data processing application 414 encrypts the electronic document with the recipient encryption keys for storage. At block 1112, the recipient interface application 412 notifies the designated recipient. In an illustrative embodiment, as explained above, the recipient interface application 412 generates an electronic mail message including an embedded hyperlink and transmits the message to the communication channel identified by the sender computing device 202. At block 1114, the recipient computing device obtains a secure communication channel with the designated recipient computing device 204.

Figure 12:
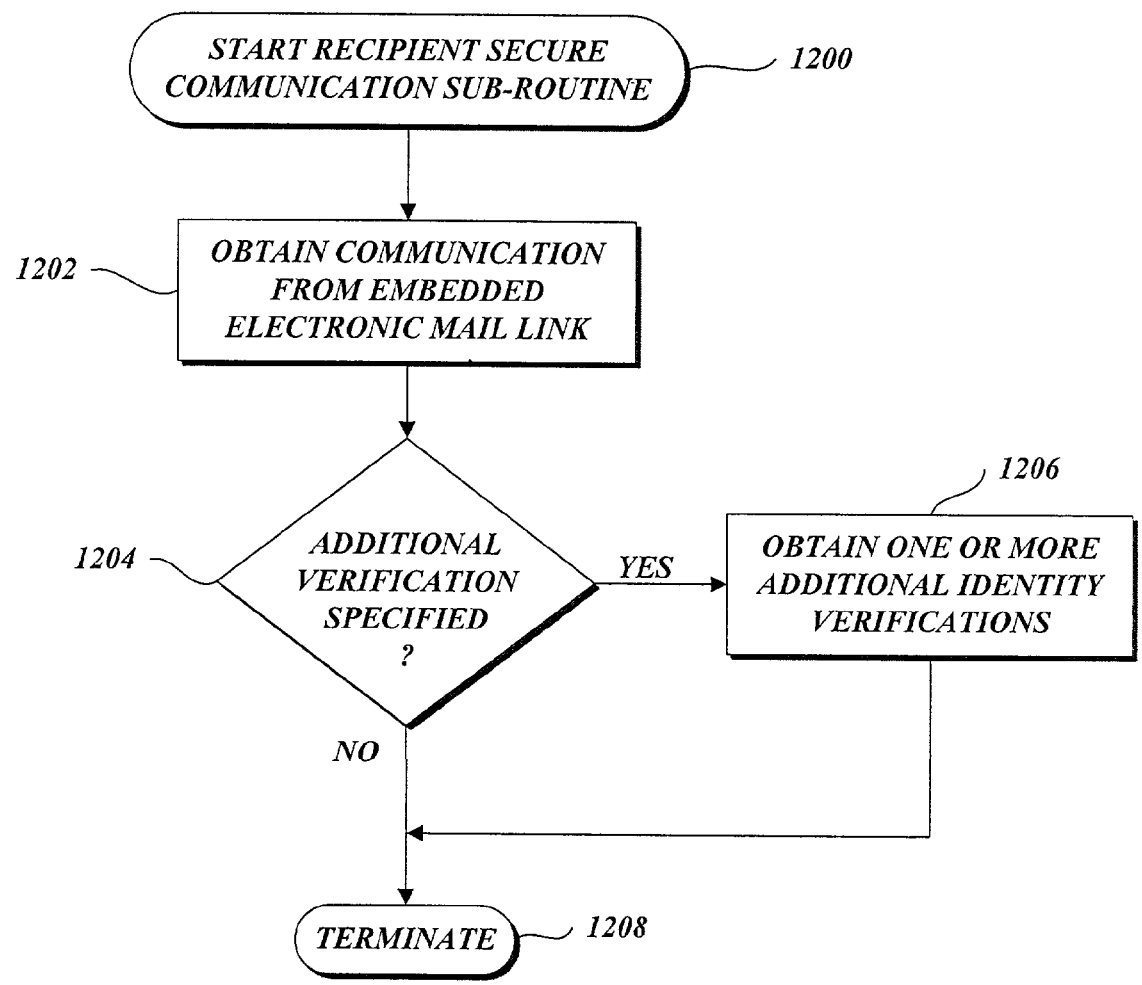
FIG. 12 is a flow diagram illustrative of a recipient secure communication sub-routine implemented by a document processing service in accordance with the present invention.

FIG. 12 is a flow diagram illustrative of a recipient secure communication sub-routine 1200 implemented by the document processing server 206 in accordance with the present invention. At block 1202, the recipient interface application 412 obtains communication via the embedded hyperlink. In an illustrative embodiment of the present invention, the secure communication is a SSL communication, via a Web browser or other software application similar to the secure communication established between the sender computing device 202 and the sender interface application 410. Additionally, the embedded hyperlink can include information that allows the recipient interface application 412 to identify the designated recipient computing device 204 and to which the particular electronic document the recipient is to be provided access. However, one skilled in the relevant art will appreciate that a secure communication channel with the recipient computing device 204 may also be established with a variety of alternative login methods or secure communication mechanisms.

At decision block 1204, a test is conducted to determine whether additional identity verification is required. As explained above, the document processing server 206 may allow the sender computing device 202 to specify additional identity verification. If the additional identity verifications are required, at block 1206, the recipient interface application 412 obtains the specified identity verifications from the recipient computing device 204. As explained above, the additional identity verifications can include, but are not limited to, passwords, third-party verification services, and the like. At block 1208, the sub-routine 1200 terminates.

Returning to FIG. 11A, at block 1116, the data processing application 414 obtains the encrypted document from the database 208 and decrypts the document for review by the recipient computing device. At block 1118, the recipient interface application 412 transmits the electronic document to the recipient computing device 204. At block 1120, the data processing application 414 generates a time stamp to confirm that the recipient computing device 204 has accessed the document. In an illustrative embodiment of the present invention, the electronic document may be transmitted to permanently reside on the recipient computing device. Alternatively, the recipient interface application 412 may transfer a read-only file format that will only allow the recipient computing device 204 to review the document.

With reference now to FIG. 11B, at block 1122, the sender interface application 410 generates a notification to the sender computing device 202 that the recipient computing device 204 has accessed the electronic document. The notification can be in the form of an electronic message, short message service message, electronic page, bulletin board message, telephone call, and the like. Moreover, the sender computing device 202 may specify a specific type of notification order. One skilled in the relevant art will appreciate that the sender notification may be omitted and/or may be delayed until all the designated recipients have accessed the document, may be sent if a designated recipient does not retrieve the document within a give period of time, or some other specified event occurs.

At block 1124, a test is conducted to determine whether sender signature verification is required. In an illustrative embodiment of the present invention, the recipient computing device 204 may request some type of identity verification of the sender computing device 202. Accordingly, the recipient interface application 412 may generate, or otherwise utilize, digital certificates verifying the identity of the sender computing device. If additional identity verification is required, at block 1126, the data processing application generates the sender verification and the recipient interface application 412 transmits the verification. At block 1128, the sub-routine 1100 terminates.

Figure 13:
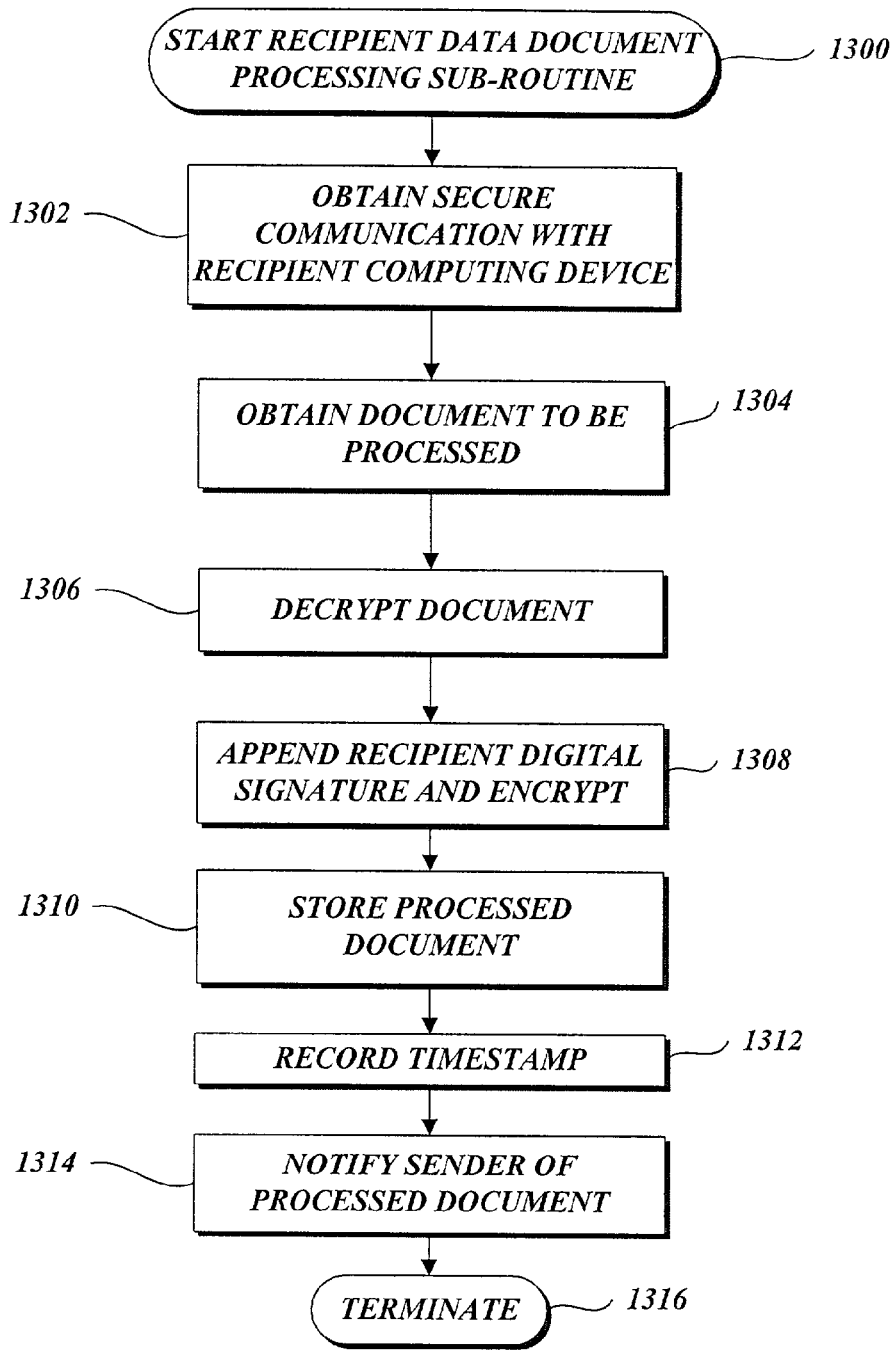
FIG. 13 is a flow diagram illustrative of a recipient data document processing sub-routine implemented by a document processing server in accordance with the present invention.

With reference now to block 906 (FIG. 9), FIG. 13 is a flow diagram of a recipient data document processing sub-routine 1300 implemented by the document processing server 206 in accordance with the present invention. In an illustrative embodiment of the present invention, the recipient computing device 204 can also specify additional processing to the electronic document. At block 1302, the recipient interface application 412 obtains a secure communication with the recipient computing device 204. One skilled in the relevant art will appreciate that sub-routine 1300 may occur directly subsequent to sub-routine 1200 and would not require a new secure communication channel. Alternatively, if the review and processing of the electronic document do occur within a given period of time, the recipient interface application 412 and the designated recipient computing device 204 may have to reestablish a secure communication channel.

At block 1304, the data processing application 414 obtains the document to be processed from the database 208. At block 1306, the data processing application 414 decrypts the document. At block 1308, the data processing application 414 generates a digital signature corresponding to the designated recipient computing device 204 and appends, or otherwise logically associates, the digital signature to the electronic document. At block 1310, the data processing application, encrypts the digital signature with a recipient specific signature encryption key.

At block 1312, the data processing application 414 generates a time stamp of the process transaction. At block 1314, the sender interface application 410 generates a notification to the sender computing device 202 and, optionally, to any additional designated recipient computing devices 204. At block 1316, the sub-routine 1300 terminates.

Through the utilization of Web-based communication channels and internally maintained encryption keys, the present invention facilitates the transfer and processing of electronic documents without requiring each party to create, maintain, and/or exchange encryption key information or otherwise manipulate secure communication functionality. Additionally, the present invention facilitate dynamic levels of identity verification as specified by sender computing device 202 and the designated recipient computing devices 204.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A method for a document processing server to process communications between a sender and at least one recipient and to verify an identity of the sender and the at least one recipient for establishing a secured communication channel, the method comprising:
at the document processing server:
obtaining a request from the sender to transmit an electronic document to at least one recipient;
obtaining an electronic document corresponding to the request from the sender, wherein the electronic document is encrypted with an encryption key corresponding solely to the sender and the document processing server;
processing the electronic document wherein processing the electronic document includes encrypting the electronic document with an encryption key corresponding solely to at least one recipient and the document processing server;
verifying the identity of the designated at least one recipient and the identity of the sender;
upon verification, establishing a secured communication channel with the at least one recipient;
transmitting the processed electronic document to the designated at least one recipient;
wherein the sender and the designated at least one recipient do not verify the identity of each other; and
wherein the sender and the designated at least one recipient do not share encryption keys.

2. The method as recited in claim 1, wherein obtaining a request to transmit an electronic document includes obtaining a request via an Internet Web browser.

3. The method as recited in claim 1, wherein obtaining an electronic document includes:
establishing a secure communication connection with the sender; and
obtaining an encrypted document.

4. The method as recited in claim 3, wherein establishing a secure communication connection includes establishing a secure sockets layer communication channel.

5. The method as recited in claim 1, wherein obtaining a request from the sender to transmit an electronic document includes obtaining a request to append an electronic signature corresponding to the sender to the electronic document.

6. The method as recited in claim 5, wherein processing the electronic document includes:
appending an electronic signature corresponding to the sender; and
encrypting the electronic signature corresponding to the sender with a sender specific encryption key.

7. The method as recited in claim 1, wherein establishing a communication channel with the at least one recipient includes:
transmitting an electronic mail message to the designated at least one recipient, the electronic mail message including a unique identifier; and
obtaining a communication from the designated at least one recipient including the unique identifier.

8. The method as recited in claim 7, wherein the unique identifier is a hyperlink, and wherein establishing a communication channel includes obtaining a request to access a Web site corresponding to the hyperlink.

9. The method as recited in claim 1, wherein verifying the identity of the designated at least one recipient includes obtaining an identity verification from the designated at least one recipient.

10. The method as recited in claim 9, wherein the identity verification includes a unique identifier submitted with a request.

11. The method as recited in claim 9, wherein the identity verification includes a password.

12. The method as recited in claim 9, wherein the identity verification includes verification from a third-party source.

13. The method as recited in claim 1 further comprising transmitting a verification corresponding to the identity of a sender to the designated at least one recipient.

14. The method as recited in claim 1 further comprising:
obtaining a request to append an electronic signature corresponding to the recipient to the electronic document;
logically associating an electronic signature corresponding to the designated at least one recipient; and
encrypting the electronic signature corresponding to the designated at least one recipient with a recipient specific encryption key.

15. The method as recited in claim 14 further comprising:
establishing a communication channel with a second designated recipient; and
transmitting the processed electronic document to the designated second recipient;
wherein the sender and the designated second recipient do not exchange encryption keys.

16. The method as recited in claim 15 further comprising:
obtaining a request to append an electronic signature corresponding to the second recipient to the electronic document;
logically associating an electronic signature corresponding to the second recipient; and
encrypting the electronic corresponding to the second recipient with a second recipient specific encryption key.

17. A computer-readable medium having computer-executable instructions for performing the method recited in any one of claims 1-16.

18. A computer system including a processor, a memory, and an operating system, the computer system configured to perform the method recited in any one of claims 1-16.

19. A system for processing communications, the system comprising:
a sender computing device configured to transmit a request to process an electronic document;
at least one recipient computing device corresponding to an identifiable communication channel; and
a document processing server, the document processing server configured to verify the identities of the sender computing device and the at least one recipient computing device and to establish secure communications with the sender computing device and the at least one recipient computing device;
wherein the document processing server processes an electronic document and transmits the processed electronic document between the sender computing device and the recipient computing device without the sender computing device and the at least one recipient computing device sharing encrypting keys and wherein the document processing server processes the electronic documents with an encryption key corresponding solely to the document processing server and the recipient computing device; and
wherein the sender computing device and the at least one recipient computing device do not verify the identity of each other.

20. The system as recited in claim 19, wherein the sender computing device includes a browser application program configured to request a Web page for requesting the processing of the electronic document.

21. The system as recited in claim 20, wherein the browser application is con figured to establish a secure communication channel with the document processing server without additional participation by a sender.

22. The system as recited in claim 21, wherein the secure communication channel is a secure sockets layer communication channel.

23. The system as recited in claim 21, wherein the secure communication channel is a transport layer security communication channel.

24. The system as recited in claim 19, wherein the request to process the electronic document includes a request to append a signature corresponding to a sender to the electronic document.

25. The system as recited in claim 24, wherein the document processing server is further configured to:
logically associate the electronic signature corresponding to the sender to the electronic document; and
encrypt the electronic signature corresponding to the sender with a sender specific encryption key.

26. The system as recited in claim 19, wherein the recipient computing device is configured to obtain electronic mail message including a unique identifier corresponding to a recipient and further configured to establish a secure communication channel with the document processing server.

27. The system as recited in claim 26, wherein the recipient computing device includes a browser application configured to establish a secure communication channel with a document processing server without requiring additional participation by a recipient.

28. The system as recited in claim 27, wherein the browser application establishes a secure sockets layer communication channel.

29. The system as recited in claim 27, wherein the browser application establishes a transport layer security communication channel.

30. The system as recited in claim 26, wherein the document processing sewer further obtains an identity verification from the at least one recipient and the sender.

31. The system as recited in claim 30, wherein the identity verification is the possession of the unique identifier.

32. The system as recited in claim 30, wherein the identity verification is the use of a password.

33. The system as recited in claim 30, wherein the identity verification is the utilization of a third party verification service.

34. The system as recited in claim 26, wherein the document processing sewer transmits sender identity verification to the recipient computing device.

35. The system as recited in claim 26, wherein the document processing server is further configured to:
append an electronic signature corresponding to tile recipient to the electronic document; and
encrypt the electronic signature corresponding to the recipient with a recipient specific encryption key.

36. The system as recited in claim 35 further comprising at least two recipient computing devices corresponding to at least two identifiable communication channels.

37. A computer-readable medium having computer-executable components for processing communications between a sender computing device and a plurality of recipient computing devices via a document processing server which receives from the sender computing device a request for transmitting a document to one of the plurality of recipient computing devices, the computer-readable medium comprising:
an interface component configured to allow secure communication between the sender computing device and each of the plurality of recipient computing devices without requiring the exchange of encryption keys between the sender computing device and the each of the plurality of recipient computing devices;
a document processing component configured to verify the identity of the one of the plurality of recipient computing devices and the sender computing device and to process document requests from the sender computing device and append to the document at least an electronic signature corresponding to the sender;
wherein the interface component transmits the document to the one of the plurality of recipient computing devices which is designated by the sending computer device and wherein the document processing server processes the electronic documents with encryption key corresponding solely to the document processing server and the recipient computing device;
wherein the sender computing device does not verify the identity of the each of the plurality of recipient computing devices; and
wherein the each of the plurality of recipient computing devices does not verify the identity of to sender computing device.

38. The computer-readable components as recited in claim 37, wherein the interface component establishes a Web browser based secure communication.

39. The computer-readable components as recited in claim 38, wherein the Web browser based secure communication is a secure sockets layer communication channel.

40. The computer-readable components as recited in claim 38, wherein the Web browser based secure communication is a transport layer security communication channel.

41. The computer-readable components as recited in claim 37, wherein the document processing component obtains an identity verification from the each of the plurality of recipient computing devices and the sender computing device.

42. The computer-readable components as recited in claim 41, wherein the identity verification includes the possession of a unique identifier.

43. The computer-readable components as recited in claim 41, wherein to identity verification includes the utilization of a password.

44. The computer-readable components as recited in claim 41, wherein the identity verification includes a third party verification service.

45. The computer-readable components as recited in claim 37, wherein the document processing component appends an electronic signature corresponding to the recipient.

* * * * *

UNITED STATES PATENT AND TRADEMARK OFFICE
CERTIFICATE OF CORRECTION

PATENT NO. : 7,360,079 B2
APPLICATION NO. : 10/039031
DATED : April 15, 2008
INVENTOR(S) : D.A.E. Wall It is certified that error appears in the above-identified patent and that said Letters Patent is hereby corrected as shown below:

| COLUMN | LINE | ERROR |
|---|---|---|
| 16 (Claim 16, | 33 line 7) | "electronic corresponding" should read --electronic signature corresponding-- |
| 16 (Claim 19, | 60 line 18) | "encrypting keys" should read --encryption keys-- |
| 17 (Claim 21, | 6 line 2) | "con figured" should read --configured-- |
| 17 (Claim 30, | 43 line 2) | "sewer" should read --server-- |
| 17 (Claim 34, | 53 line 2) | "sewer" should read --server-- |
| 17 (Claim 35, | 57 line 3) | "tile" should read --the-- |
| 18 (Claim 37, | 25 line 25) | "with encryption" should read --with an encryption-- |
| 18 (Claim 37, | 32 line 32) | "of to sender" should read --of the sender-- |

UNITED STATES PATENT AND TRADEMARK OFFICE
CERTIFICATE OF CORRECTION

PATENT NO. : 7,360,079 B2
APPLICATION NO. : 10/039031
DATED : April 15, 2008
INVENTOR(S) : D.A.E. Wall It is certified that error appears in the above-identified patent and that said Letters Patent is hereby corrected as shown below:

| COLUMN | LINE | ERROR |
|---|---|---|
| 18 (Claim 43, | 53 line 2) | "wherein to identity" should read --wherein the identity-- |

Signed and Sealed this

Eleventh Day of November, 2008

JON W. DUDAS
*Director of the United States Patent and Trademark Office*

(12) EX PARTE REEXAMINATION CERTIFICATE (9140th)
United States Patent
Wall

(10) Number: US 7,360,079 C1
(45) Certificate Issued: Jul. 17, 2012

(54) SYSTEM AND METHOD FOR PROCESSING DIGITAL DOCUMENTS UTILIZING SECURE COMMUNICATIONS OVER A NETWORK

(75) Inventor: David A. E. Wall, Kirkland, WA (US)

(73) Assignee: Yozons, Inc., Kirkland, WA (US)

Reexamination Request:
No. 90/011,756, Jul. 1, 2011

Reexamination Certificate for:
Patent No.: 7,360,079
Issued: Apr. 15, 2008
Appl. No.: 10/039,031
Filed: Jan. 4, 2002

Certificate of Correction issued Nov. 11, 2008.

Related U.S. Application Data

(60) Provisional application No. 60/259,941, filed on Jan. 5, 2001.

(51) Int. Cl.
*H04L 29/00* (2006.01)

(52) U.S. Cl. ........................ 713/155; 713/165; 713/167; 713/176; 380/30; 705/67

(58) Field of Classification Search ........................ None
See application file for complete search history.

(56) References Cited

To view the complete listing of prior art documents cited during the proceeding for Reexamination Control Number 90/011,756, please refer to the USPTO's public Patent Application Information Retrieval (PAIR) system under the Display References tab.

*Primary Examiner* — Andrew Nalven

(57) ABSTRACT

A system and method for processing communications between a sender computing device and at least one recipient computing device are provided. A sender establishes a secure communication with a document processing server and requests the processing of an electronic document, which can include the appending of a digital signature. The document processing server processes the electronic document and establishes secure communications with one or more designated recipients. The document processing server can implement sender specified recipient identify verification and provide further processing of the electronic document as designated by the recipients.

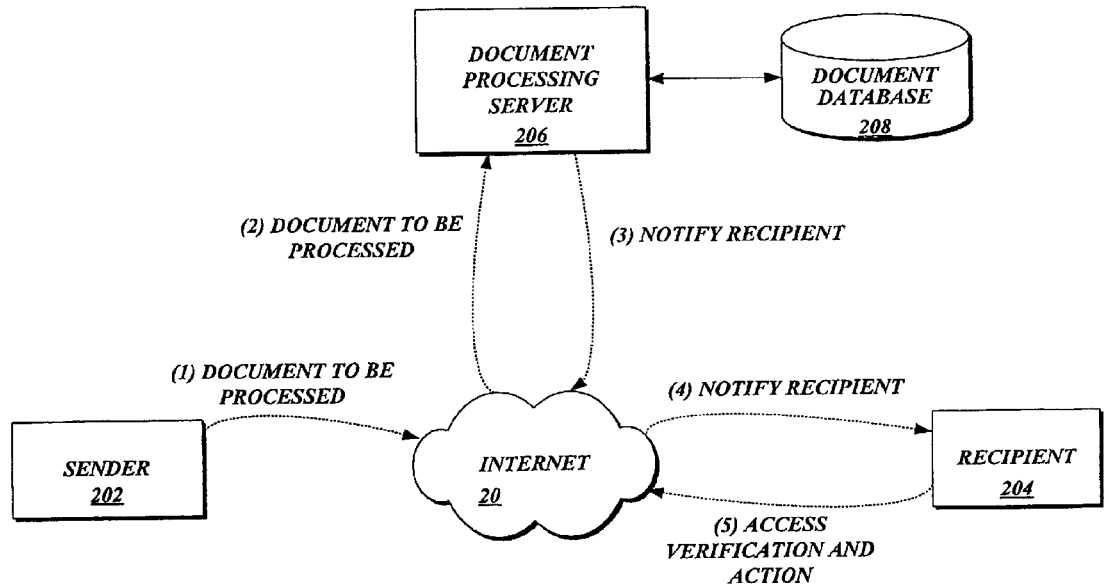

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-45 is confirmed.

* * * * *